United States Patent
Aharonson

(10) Patent No.: US 8,478,976 B2
(45) Date of Patent: Jul. 2, 2013

(54) SYSTEM AND METHOD OF AUTOMATED FUNCTION ACTIVATION FOR ELECTRONIC DEVICES

(75) Inventor: Dov Aharonson, Herzelia (IL)

(73) Assignee: Key Sean Ltd., Herzelia (IL)

( * ) Notice: Subject to any disclaimer, the term of this patent is extended or adjusted under 35 U.S.C. 154(b) by 1177 days.

(21) Appl. No.: 11/984,646

(22) Filed: Nov. 20, 2007

(65) Prior Publication Data

US 2008/0120495 A1      May 22, 2008

Related U.S. Application Data

(60) Provisional application No. 60/859,960, filed on Nov. 20, 2006.

(51) Int. Cl.
*G06F 9/24*      (2006.01)
*G06F 15/177*   (2006.01)

(52) U.S. Cl.
USPC ............. 713/2; 713/1; 712/226; 399/75

(58) Field of Classification Search
USPC ............. 713/1, 100, 2; 712/226; 399/75
See application file for complete search history.

(56) References Cited

U.S. PATENT DOCUMENTS

| | | | |
|---|---|---|---|
| 5,454,110 A * | 9/1995 | Kannan et al. ............... | 713/2 |
| 5,499,108 A | 3/1996 | Cotte et al. | |
| 5,623,285 A | 4/1997 | Aharonson et al. | |
| 5,822,080 A | 10/1998 | Chavez | |
| 6,178,503 B1 * | 1/2001 | Madden et al. ............... | 713/2 |
| 6,327,653 B1 * | 12/2001 | Lee ............... | 713/100 |
| 7,003,654 B2 * | 2/2006 | Baron ............... | 713/1 |
| 7,212,295 B2 | 5/2007 | Falk et al | |
| 7,391,979 B2 * | 6/2008 | Yamaguchi et al. ........ | 399/9 |
| 7,650,522 B2 * | 1/2010 | Linsley-Hood et al. .... | 713/321 |
| 2004/0085574 A1 | 5/2004 | Falk et al. | |

* cited by examiner

*Primary Examiner* — Thuan Du
(74) *Attorney, Agent, or Firm* — Pearl Cohen Zedek Latzer, LLP

(57) ABSTRACT

A system and method of storing a default function from among possible functions to be executed by a device, and executing the default function after a pre-defined interval, if during the interval a user does not respond to a notification of the upcoming execution of the default function, through the user's providing a signal of his desire not to execute the default function.

7 Claims, 2 Drawing Sheets

SYSTEM AND METHOD OF AUTOMATED FUNCTION ACTIVATION FOR ELECTRONIC DEVICES

CROSS REFERENCE TO RELATED APPLICATIONS

This application claims the benefit of prior U.S. Provisional Application 60/859,960, filed Nov. 20, 2006 and entitled 'A System to Combine Automated Processing with Options Selection', which is incorporated herein by reference in its entirety.

BACKGROUND TO THE INVENTION

Though electronic devices may include a plethora of features and functions from which a user may choose, some users find that in reality they use a very limited range of features, and frequently select the same function when they start up or use such a device. For example, a user may log onto a network connection in the morning and check his email. Though sometimes the user may take other actions before checking email, this sequence may be a usual practice of the user. Users find that the repetition of key strokes and processes needed to perform commonly activated functions is tedious and time consuming.

SUMMARY OF THE INVENTION

Some embodiment of the invention include a system having a memory to store two or more possible functions for execution by a device, and to store a default function from among the two or more functions to be executed by the device; and to store an interval to elapse between a presentation on an output device of an indication of the default function, and an execution of the default function. The system may include a processor to generate a signal to execute the default function unless during such interval the processor receives a signal from an input device that reflect an action or desire of a user not to execute the default function.

In some embodiments, the processor may select as a default function a function from among the two or more function, where the selection is based on a prior selection by a user of that function from among the two or more functions.

In some embodiments, a processor may calculate the interval based on a duration of an interval in a prior operation of the device between a presentation on the output device of an indication of a default function to be executed from among the two or more functions, and a receipt by the processor from an input device of a selection of a function to be executed.

In some embodiments, a processor may detect a signal of an activation of the device, such as an activation of a scanner by feeding in a document to be scanned, an activation of an automatic customer service answering system up receipt of a call, or an activation of a telephone or other personal communication device.

In some embodiments, a signal from an input device may include moving a mouse cursor, tapping a key on a key pad and saying a word into a microphone.

Some embodiments of the invention may include selecting a function for execution by an electronic device, by presenting on an output device an indication of a function from which may be selected a function for execution by the device, presenting on the output device an indication of a default function from among the possible functions to be executed, where the default function is to be executed by if a signal reflecting a pre-defined action is not received within a pre-defined interval.

In some embodiments, selecting the default function from among several functions, may be based on a selection made in a prior activation of the device.

In some embodiments, selecting the pre-defined interval may be based on an interval in a prior activation of the device between the presentation on an output device of the default function and the receipt of the signal in the prior activation.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION OF THE PREFERRED EMBODIMENTS

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "selecting," "evaluating," "processing," "computing," "calculating," "associating," "determining," "designating," "allocating" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. In some embodiments, one or more methods of embodiments of the invention may be stored on an article such as a memory device, where such instructions upon execution result in a method of an embodiment of the invention. Some embodiments may be expressed as an interface or presentation that may be displayed to a user by way of for example a computer display, and by which a user may observe and appreciate a significance of data. Some embodiments may be practiced through for example a voice activated interface such as an automated customer service telephone system.

In some embodiments, a device may include for example a computer or computer platform, or other suitable device that may include a processor (such as, but not limited to, a processor in a telephone, personal communication device, PDA, remote control, automatic answering system, GPS and car control system) and that may be suitable for performing one or more functions and for accepting a selection of such one or more functions to be performed.

Figure 1:
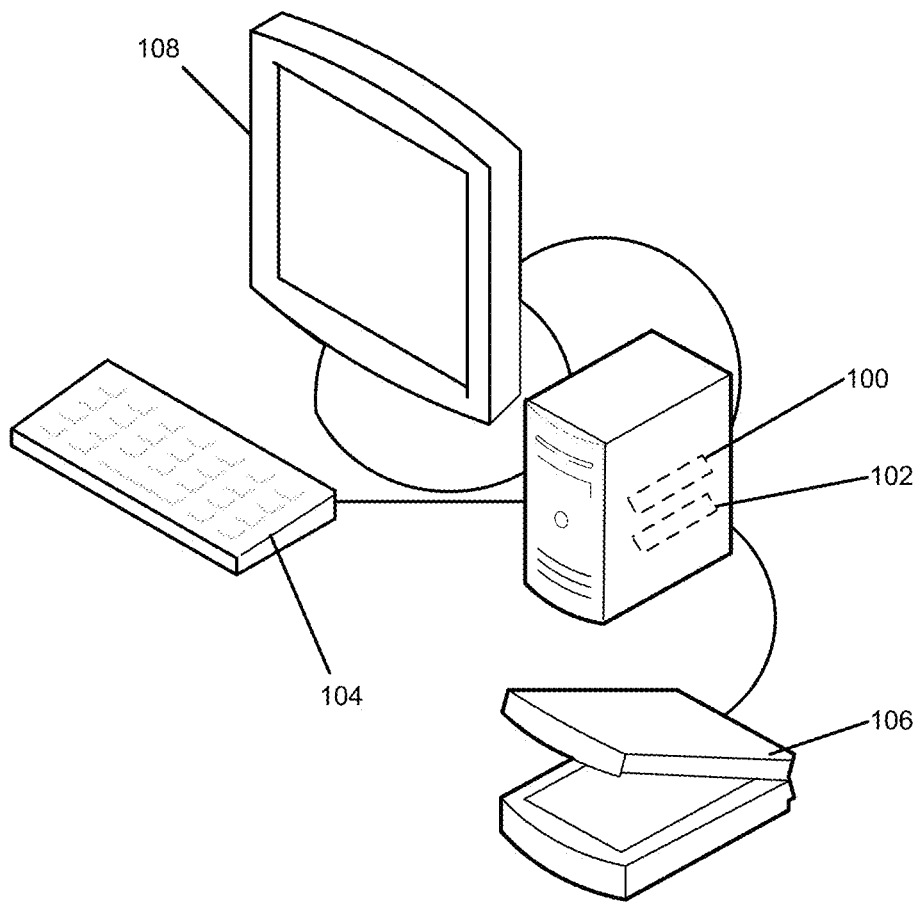
FIG. 1 is a schematic diagram of a system in accordance with an embodiment of the invention.

Reference is made to FIG. 1, a schematic diagram of a system in accordance with an embodiment of the invention. In some embodiments, a system may include one or more electronic devices, such as a computer or computer platform that may include a processor 100, a memory 102, an input device 104, such as a key pad, mouse, telephone, or other input device, an output device 108, such as a computer screen or display or a speaker to convey voice commands, and for example another device 106, such as a scanner, that may be activated upon a selection by a user.

In some embodiments, a user may put a page into a scanner or take some other action to start-up or activate a device 106. In some embodiments, a system may have one or more instructions stored in memory 102 that may indicate that from among all of the options that may be available to a user, the user usually or is likely to, scan one or more pages into the system and for example attach the scanned documents to an email. The system may proceed to take these usual or likely actions, and may indicate to a user that if the user wishes to stop such usual or likely actions, the user must take some other actions within a fixed time. For example, when a page is inserted into the device 106, the scanner or device 106 may automatically proceed to scan the pages and attach the scanner pages to an email which may be displayed for the user. Output device 108, may indicate at one or more points during the process, that to abort the function or to select a different option, the user may simply touch a mouse, click a button or take another pre-defined action on for example an input device 104, which will stop the process of the default function or provide the user with a menu of functions from which the user may select. In some embodiments, a menu or selection of options may be presented to the user, and concurrently or at some other point, a message about the default function may also be presented to the user.

In some embodiments, an operation such as insertion of a document into a scanner or a start up of a telephone will trigger the scanning process or another default function, such that the scanner or another device 106 may automatically start pulling the document into scanning position and start scanning, or make other preparatory actions that may precede the actual default function. In parallel, device 106, by way of for example processor 106, may monitor the user inputs through the mouse, keyboard and input device 104 such as voice command etc. If the device senses an input from the user by way of an input device 104, an embodiment of the invention by way of for example processor 100 may terminate the default function. If the user does not provide such indication, device 106 may proceed automatically with the default function, and for example conclude the scanning and then for example attach the scanned document to an email message.

In some embodiments, there may be presented to a user during a time period when the default is waiting to activate, a list of options or functions that may be selected by the user, and/or an indication that the user may cancel activation of the default by touching a mouse or clicking a button or taking some other action through for example an input device 104. Receipt by processor 100 of a signal from touching the mouse or tapping a key may be pre-defined to reflect a desire of a user not to execute a default function. In some embodiments, the default action may be among the functions that may be selected on the list presented to the user. In some embodiments, the activation of the default function may not be the same as the processes that such as a 'Press any key to abort' type of instruction. In the later, the process that is running, such as for example a start-up, set up or boot process may be running and may be interrupted by an action of a user. In embodiments of the invention, a selection of two or more functions may be presented to a user, and a particular selection from among those functions may be made for the user by way of for example processor 100 unless the user takes an action, via for example an input device 104.

In another embodiment, a user may call a customer service center, and may for example type in an account number. A system may know from, for example, a past or prior call by the user, that the user usually or frequently checks his account information, or takes certain other actions from among several possible actions that may be performed on the system. An output device 108, such as an automated operator or other voice system may announce to the caller that the system is retrieving his account data or executing some other process, and that if the user wishes to stop the process of checking his balance, he may touch any button, say any word or take another action through input device 104. In some embodiments, a defined delay period may be provided between the time that the system indicates to the user that the default process is to be undertaken and provides the user with an option to select a different process, and the time when the system actually performs the default process.

In some embodiments, a phone such as a cell phone may be programmed or may learn that a user frequently or usually turns on the phone and dials a particular number or checks his messages. A startup function of the phone may indicate that the phone will dial the necessary number to collect messages unless a user takes a particular action such a pressing a button on the phone or saying a word into the microphone, which may cause an interruption or suspension of the default function. The screen on the phone, or some other output device 108 may signal to the user that the default function will be executed unless the user signals that another function is to be executed or unless the user signals that the default function should not be executed. In some embodiments, the execution of the default function may be delayed by a pre-defined or learned interval from the time that the output device indicates that the user may select from among several functions or may cancel the execution of the default function. In some embodiments, this interval may be pre-set or may be adjusted based on past or prior response intervals to a presentation of selection of functions to be executed. For example, a device may learn from prior responses or actions by a user on the device, that a user is slow or generally takes a long time to respond to a message about a default function to be executed. In some embodiments, the device may in response increase the interval between the time a user is notified about the default function that will be started, and the time that the user has to abort or cancel the default function through an input of a signal. In some embodiments, a time out or delay interval between the time that the user received a message about the activation of the default function, and the time that the default function is activated, may be dynamic, or set automatically as a result of the statistics of the user response time to previous activations or it may be dynamically increased as a response to user's actions which may be interpreted as a request from the user to delay the start of the default function because the user is still thinking. For example, in some embodiments, moving a mouse or other input device 104 may be used as an indication to delay a start of a default function, while clicking the mouse may be used as an indication to cancel the start of the default function.

In some embodiments the default function that may be activated when a device is turned on, when a paper is inserted into a scanner or upon another signal, may be pre-programmed into the device. In some embodiments, the default function may be the last selected function that was activated in the device. In some embodiments, memory 102 may collect data from past uses of the device and may select as the default function a process or function that is most often selected or that may match another history or usage of the device. For example, a first default function may be selected during work hours, when a user may be working on the device, while a second default function may be selected for use in the evenings when children may be using the device for games or entertainment.

In some embodiments, a device that has several functions that may be selected may, when a user takes a particular action such as moving a mouse, present an Option Selection process such as a drop-down screen to provide a user with options from which to select a function other than a default function. In some embodiments, inputs about a default function may be stored in a setup file or registry and a user may there save extra instructions or parameters to direct the application function.

In some embodiments, a device may provide a message or signal to the user to ask whether the user wishes to enable a default process or function, such as checking email or taking some other action, and may take the default action only if no response is received from the user.

In some embodiments, a default function may display instructions on how to operate the device, taking the user step by step through for example a tutorial of the device unless the user takes some action, so that when a device is turned on or at other times, a user is instructed on how to use the device. Other processes or functions may be added as part of a default function or process.

In some embodiments, a device may provide a user with feedback in visual, vocal or any other available output form, or give some explanation through the device that the device is proceeding to execute a default function, and that the user may select a different function instead of the default function by taking an action.

In some embodiments, a device may be located remotely, and may communicate with a user or a peripheral or other device through a communication channel or through another device that may be connected to a communication channel. For example, in a financial transaction over a network, a device located at for example a bank office may remotely process check deposits. A user may scan a check from, for example, his home or office by way of a desktop scanner. The feeding process of the paper into the scanner may automatically activate the scanner which may scan the check. A user may be presented with a list of functions or options that may be performed by the scanner or by other devices connected to the network. If the user does not take an action such as touching a mouse or a key on an input device 104, a default function may be selected and a deposit of the check may be initiated between the user and the remote bank. If the user does not take a designated action such as touching a mouse or an input device 104, a device in connection with the bank may authenticate the check and provide the user with a confirmation of the deposit, by way of for example an email of such confirmation. Such transaction may have a built-in encryption process to keep the integrity and secure the transaction against external intervention. If the user performs the pre-defined action such as touching the input device 104 during the scanning process or some other time out period, the default deposit function may not be executed, and another scanning process may be selected. An output device 108 may provide the user with an option selection menu or other means of making a choice as to a function to be executed.

In some embodiments a device or function may interpret an input from the user as an indication that the user wishes to activate the "Option-Selection", so that the default function is not activated. In some embodiments, a particular action through an input device 104 may be pre-defined, such as moving a mouse or cursor over a specific area of the application or inputting a specific sequence of inputs. If within a specific limited time there is no sufficient indication from the user, the default function may be activated.

The operation to be performed as a default function may be a single function or a complete set of functions or scripts. These operations may be set explicitly by the user or the device may learn usage patterns of a user, based on for example statistics of actual usage of the device by a specific user or by average user. In some embodiments, a last or previously executed operation or set of operations may be set as the new default.

In some cases a device may have to perform one or more operations before it gets to an actual decision point as to whether to execute a default operation. In such case the delay or time out period may be concurrent with the execution of these start-up or preparatory operations. For example in the case of a scanning operation, insertion of a document into the scanner may trigger the scanning processes, while a default function may include attaching the scanned document to an email. The scanning may proceed during the time out period during which the user may be allowed to select an alternate function or let the default proceed to completion.

In some embodiments, a cancel or escape key may allow a user to cancel the execution of a default function even after a time out period has elapsed.

In some embodiments, a default function may include more than one function or for example a script or sequence of functions. Such sequence may be a fixed set or dynamic set which is created as a result of user operations statistics or specific and personal user requirements. It may also be a result of specific learning criteria given to the device to study the user activity and the results and consequences and the user's past reactions to these activities. For example, a user may log onto his computer each morning and send an email to his wife indicating that he arrived safely at work. A device may learn that the default function is to be logging on and sending such as email. The device may indicate to the user upon a log-on, that it will proceed to execute the default function unless the user takes a pre-defined action.

In some embodiments, there may be included one or multiple inputs from a menu-bar and or popup-window with buttons and other user interface selections and/or special dedicated keys on the input devices and/or standard keyboard keys combination accepted as instructions and/or voice activating instructions input and or script or command line generated by processes running on a device.

In some embodiments, data about a scanned document may be used as an input for the setting of a default operation. For example, the appearance in a scan of check markings such as electronic ink in given sequences may result in a default operation being set to scan check and deposit a check.

In some embodiments, scanned data to be interpreted may be in a form of readable letters numbers words and sentences, barcode information, special symbols or marks all of them in a special expected format or in an unformatted document. In some embodiments, a special sticker may be stamped or placed on a document before scanning, where the sticker includes an indication of a default functions.

In some embodiments, a display may indicate to a user what the default is and when it will be activated.

Figure 2:
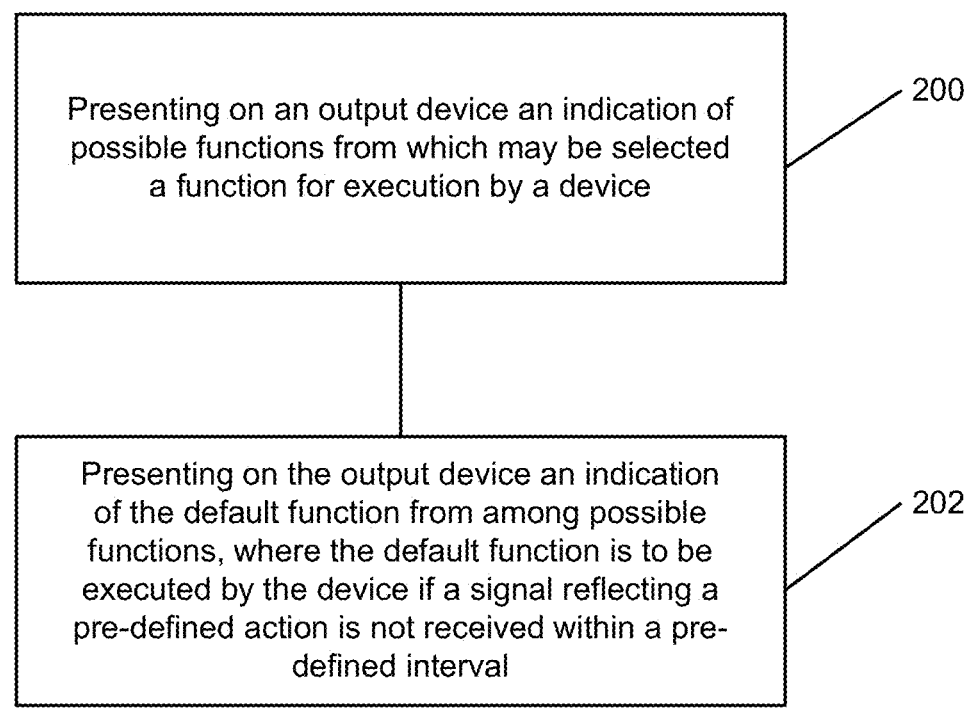
FIG. 2 is a schematic presentation of a method in accordance with an embodiment of the invention.

Reference is made to FIG. 2, a flow chart of a method in accordance with an embodiment of the invention. In block 200, there may be presented on an output device, an indication of a plurality of functions from which may be selected a function for execution by the device. In block 202, there may be presented on the output device an indication of a default function from among the several possible functions, where the default function is to be executed by the device if a signal reflecting a pre-defined action is not received within a pre-defined interval.

It will be appreciated by persons skilled in the art that embodiments of the invention are not limited by what has been particularly shown and described hereinabove. Rather the scope of at least one embodiment of the invention is defined by the claims below.

I claim:

1. A method of triggering an alternate selection to a default function executed by a device, comprising:

receiving a first input from a user;

delaying execution of said default function for a predefined delay interval in response to said first input and displaying an indication of when the function will be executed;

receiving a second input during said delay interval;

stopping said execution of said default function in response to said second input; and displaying an indication of a plurality of alternate functions to said default function for execution by said device in response to said receiving of said second input.

2. The method of claim 1, further comprising executing said default function in response to said first input.

3. The method as in claim 1, comprising receiving a third input for selecting an alternate function from among said plurality of functions.

4. The method of claim 3, further comprising providing an indication of said selecting of said alternate function, and wherein said indication is a display of said alternate function.

5. The method of claim 3, further comprising receiving an indication of said selection of an alternate function; and wherein said indication is a vocal feedback of such alternate selection.

6. The method of claim 1, further comprising executing said default function after said delay interval.

7. The method of claim 1, wherein said first input is made by a scanner device, and wherein said second input is made by a device selected from a list consisting: a mouse and a keyboard.

* * * * *

UNITED STATES PATENT AND TRADEMARK OFFICE
CERTIFICATE OF CORRECTION

| | |
|---|---|
| PATENT NO. | : 8,478,976 B2 |
| APPLICATION NO. | : 11/984646 |
| DATED | : July 2, 2013 |
| INVENTOR(S) | : Dov Aharonson |

Page 1 of 1

It is certified that error appears in the above-identified patent and that said Letters Patent is hereby corrected as shown below:

On the Title Page, Item (73) should read

-- (73)     Assignee: Key Scan Ltd., Herzelia (IL) --.

Signed and Sealed this
Twentieth Day of August, 2013

Teresa Stanek Rea
*Acting Director of the United States Patent and Trademark Office*